United States Patent
Meunier et al.

(10) Patent No.: US 7,505,607 B2
(45) Date of Patent: Mar. 17, 2009

(54) IDENTIFYING OBJECTS TRACKED IN IMAGES USING ACTIVE DEVICE

(75) Inventors: Jean-Luc Meunier, Saint Nazaire les Eymes (FR); Frederic Roulland, St. Nazaire les Eymes (FR); Alba Ferrer-Biosca, Grenoble (FR); James L. Crowley, Meylan (FR)

(73) Assignee: Xerox Corporation, Norwalk, CT (US)

( * ) Notice: Subject to any disclaimer, the term of this patent is extended or adjusted under 35 U.S.C. 154(b) by 853 days.

(21) Appl. No.: 11/013,367

(22) Filed: Dec. 17, 2004

(65) Prior Publication Data
US 2006/0133648 A1 Jun. 22, 2006

(51) Int. Cl.
G06K 9/00 (2006.01)
(52) U.S. Cl. ....................................... 382/103; 348/154
(58) Field of Classification Search ................. 382/100, 382/103, 104, 105, 106, 107; 348/154, 155, 348/169–172; 73/488; 356/27
See application file for complete search history.

(56) References Cited

U.S. PATENT DOCUMENTS

| | | | | |
|---|---|---|---|---|
| 5,528,290 | A | | 6/1996 | Saund ......................... 348/218 |
| 5,649,706 | A | * | 7/1997 | Treat et al. ................... 273/358 |
| 5,793,630 | A | | 8/1998 | Theimer et al. |
| 5,903,373 | A | | 5/1999 | Welch et al. |
| 6,005,482 | A | | 12/1999 | Moran et al. ............. 340/568.8 |
| 6,326,946 | B1 | | 12/2001 | Moran et al. ................ 345/156 |
| 6,411,732 | B1 | | 6/2002 | Saund ......................... 382/187 |
| 6,517,266 | B2 | | 2/2003 | Saund ........................... 400/88 |
| 6,538,676 | B1 | * | 3/2003 | Peters ......................... 715/863 |
| 6,542,621 | B1 | * | 4/2003 | Brill et al. ................... 382/103 |
| 6,545,705 | B1 | * | 4/2003 | Sigel et al. .................. 348/157 |
| 6,710,713 | B1 | * | 3/2004 | Russo ....................... 340/573.1 |
| 7,225,414 | B1 | * | 5/2007 | Sharma et al. .............. 715/863 |
| 7,312,766 | B1 | * | 12/2007 | Edwards ........................ 345/8 |
| 7,377,429 | B2 | * | 5/2008 | Anderson et al. ........... 235/385 |
| 7,382,895 | B2 | * | 6/2008 | Bramblet et al. ............ 382/103 |
| 2002/0126120 | A1 | | 9/2002 | Snowdon et al. ............ 345/440 |
| 2004/0091158 | A1 | | 5/2004 | Miled et al. |

OTHER PUBLICATIONS

Bat Ultrasonic Location System, http://www.uk.research.att.com/bat/ (printed Sep. 27, 2004).

R. C. Bose and D. K. Ray-Chaudhuri, "On a Class of Error Correcting Binary Group Codes," Inf. Control, vol. 3, pp. 68-79, Mar. 1960.

A. Caporossi, D. Hall, P. Reignier, J.L. Crowley, "Robust Visual Tracking from Dynamic Control of Processing", in the International Workshop on Performance Evaluation of Tracking and Surveillance, Prague, Czech Republic, pp. 23-31, May 2004.

(Continued)

*Primary Examiner*—Anand Bhatnagar
(74) *Attorney, Agent, or Firm*—Oliff & Berridge, PLC (57) ABSTRACT

Methods are disclosed for augmenting the identification of objects tracked in a sequence of images using active devices. In one embodiment, encoded information transmitted from active devices, such as a PDA, is decoded from the sequence of images to provide identifying information to a tracked region of interest. In another embodiment, motion information transmitted from active devices is associated with regions of interest tracked between images in the sequence of images. In a further embodiment, these embodiments operate together to minimize possible signal interference.

16 Claims, 7 Drawing Sheets

OTHER PUBLICATIONS

Grasso, Antonietta, Frederic Roulland, Dave Snowdon, Martin Muehlenbrock, Maurizio Mesenzani, Roberta Morici,"Supporting Informal Communication across Local and Distributed Communities" published on the Internet at http://www.appliancestudio.com/cscw/grasso.pdf (printed Sep. 27, 2004).

ImaLab Homepage, available on the Internet at http://www-prima.inrialpes.fr/lux/Imalab (printed Sep. 27, 2004).

Kalman, "A New Approach to Linear Filtering and Prediction Problems", in Transactions of the ASME, Journal of Basic Engineering, vol. 82, No. Series D, pp. 34-45, 1960.

W. W. Peterson, Encoding and Error-Correction Procedures for the Bose-Chaudhuri Codes, IRE Trans. Inf. Theory, vol. IT-6, pp. 459-470, Sep. 1960.

Sentient Computing Project Home Page, available on the Internet at http://www.uk.research.att.com/spirit/ (printed Sep. 27, 2004).

Stiefelhagen, Rainer, Jie Yang, Alex Waibel, "Simultaneous Tracking of Head Poses in a Panoramic View", International Conference on Pattern Recognition—ICPR 2000, Barcelona, Spain, Sep. 2000.

Transport for London, Fact Sheets, available on the Internet at http://www.tfl.gov.uk/tfl/cclondon/cc_fact_sheet_enforcement.shtml (printed Sep. 27, 2004).

XRCE Contextual Computing Website, published on the Internet at http://www.xrce.xerox.com/competencies/contextual-computing/projects/contact/home.html(printed Sep. 27,2004).

Zhao, W. Y., R. Chellappa, A. Rosenfeld, and P. J. Phillips, "Face Recognition: a Literature Survery" UMD Cfar Technical Report CAR-TR-948, 2000.

A. Caporossi et al., "Robust Visual Tracking From Dynamic Control of Processing", May 2004.

European Search Report.

* cited by examiner

IDENTIFYING OBJECTS TRACKED IN IMAGES USING ACTIVE DEVICE

BACKGROUND AND SUMMARY

The following relates generally to methods, and apparatus therefor, for identifying objects tracked in a sequence of images using active devices.

One objective of contextual computing is to make software applications context-aware. A context-aware application is one that adapts its behavior to its user(s), for example, by using information about its current user (e.g., male or female), its location (e.g., inside versus outside), its environment (e.g., operating near other devices), and the current operations it is performing (e.g., on the phone). In particular, cameras may be used to provide information regarding users actions and behavior to aid devices become more context-aware.

However, identifying passive objects, such as people, in images recorded with cameras continues to be difficult. The reason for this difficulty arises because successful identification depends on a number of factors, such as, position of objects relative to the camera, lighting conditions, and resolution of the recorded objects. Generally, different combinations of these factors limit the number of possible applications available. Accordingly, it would be advantageous to limit the effect of such factors by augmenting or supplementing a sequence of images recorded using a camera with additional information to identify objects therein.

In accordance with the various embodiments described herein, there is described a system, and method and article of manufacture, for augmenting the identification of objects tracked in a sequence of images recorded using a camera with transmissions received from active devices.

In accordance with some embodiments, the active devices transmit information identifying its location and identity, thereby enabling the tracking and the identification of objects, such as people, near or carrying the active device. In accordance with one specific embodiment described herein, IR (infrared) transmissions from active devices are used to encode identifying information in the sequence of images.

In accordance with other embodiments described herein, the active devices transmit detected motion to be used to identify tracked objects in the sequence of images. Motion may be detected with motion sensors, accelerometers, or general position systems that may be embedded in the active devices.

Advantageously, these embodiments maintain the privacy of users of active devices as each user controls the active device used for identification in the sequence of images. Also, certain of these embodiments may be used synchronized over a wireless network to provide control or identifying information to the active devices.

In accordance with these embodiments and other embodiments described herein, there are provided methods, apparatus and articles of manufacture, for identifying objects in a sequence of images. The methods include: receiving a sequence of images recorded using a camera having a field of view; detecting regions of interest in the sequence of images including at least some the objects; locating in the detected regions of interest encoded transmissions from active devices positioned in the field of view of the camera, or receiving motion information from active devices in the field of view of the camera and associating the movement information from the active devices with the movement of the detected regions of interest between images in the sequence of images; and outputting the sequence of images while identifying at least some of the regions of interest using encoded transmission identified therein or using the motion information.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

The table that follows outlines the sections of the detailed description.

| | Outline Of Detailed Description |
|---|---|
| Section | Subject |
| A. | Operating Environments |
| B. | Augmenting Identification With Video Message Data |
| B.1 | Message Coding |
| (a) | Using Time As An Identifier |
| (b) | Using Frequency As An Identifier |
| (c) | Using Digital Codes As An Identifier |
| B.2 | Message Detection |
| (a) | Region Tracking |
| (b) | Signal Detection |
| (c) | Signal Decoding |
| C. | Augmenting Identification With Transmitted Motion Data |
| D. | Example Embodiments |
| E. | Miscellaneous |

The table that follows set forth definitions of terminology used throughout the specification, including the claims and the figures.

| Term | Definition |
|---|---|
| augment | to supplement with additional information |
| active device | a portable or stationary computational device adapted to communicate with |

-continued

| Term | Definition |
|---|---|
| | other devices using one or more modes of communication |
| camera | a device adapted to record a series of images of a scene in which active devices may be present |
| identifying information | information that provides context to an object associated with an active device, such as a personal identifier associated with the user of the active device |
| transceiver | a component of a computational device adapted to receive and transmit signals |

A. Operating Environments

Figure 1:
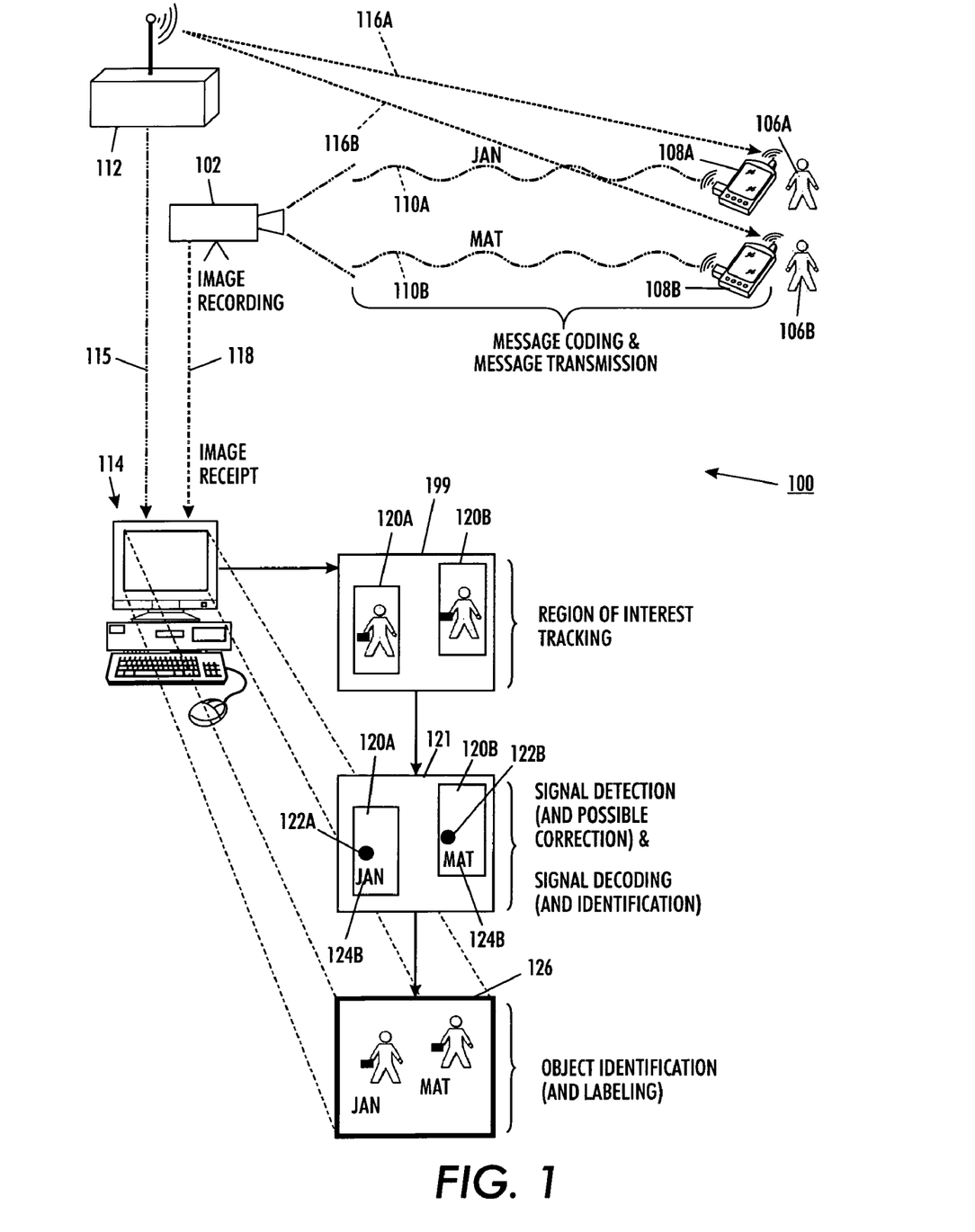
FIG. 1 illustrates a system for augmenting the identification of objects tracked in a sequence of images with message data from active devices.

FIG. 1 illustrates a system 100 for augmenting the identification of objects 106 tracked in a sequence of images with message data from active devices 108. In the embodiment shown in FIG. 1, a camera 102 records a sequence of images of objects 106 in the camera's field of view. Each of the objects 106 has associated therewith an active device 108 (e.g., a PDA, cell phone, etc.) that may be portable and that has embedded therein an emitter adapted to emit signals 110 that may be detected by the camera 102 (i.e., over the frequency spectrum that may be detected by sensors of the camera, e.g., visible or IR (infrared) frequency spectrums). In addition, the active devices 108 may include one or more transceivers adapted to receive and/or transmit signals to establish (e.g., over radio or IR) communication channels with network enabled devices communicating proximate to or through network access point 112.

Figure 8:
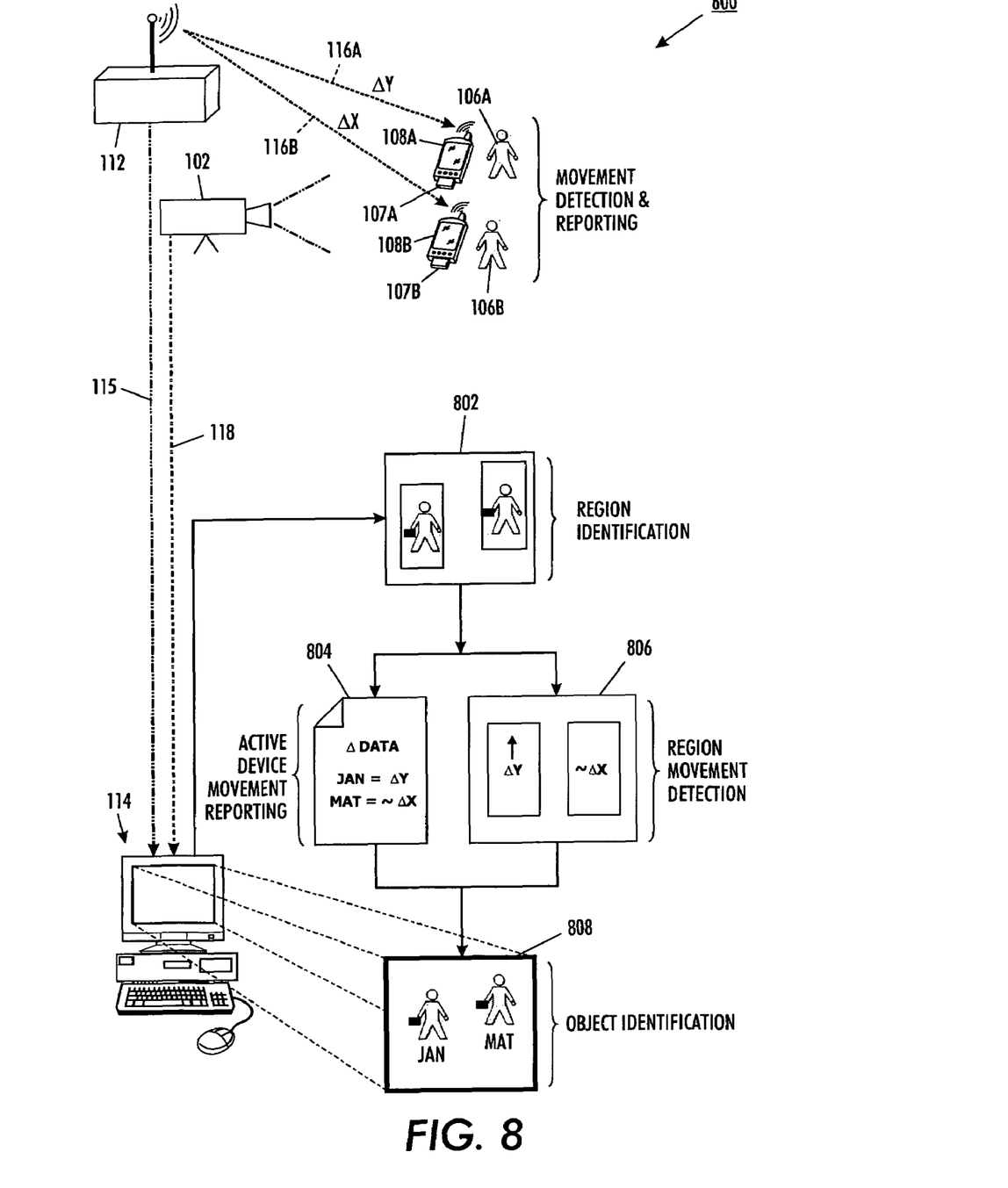
FIG. 8 illustrates a system for augmenting the identification of objects tracked in a sequence of images with motion data from active devices.

FIG. 8 illustrates a system for augmenting the identification of objects 106 tracked in a sequence of images with motion data from active devices 108. In the embodiment shown in FIG. 8 (similar to the embodiment shown in FIG. 1), a camera 102 records a sequence of images of objects 106 in the camera's field of view. Also (similar to the embodiment shown in FIG. 1), each object 106 has associated therewith an active device 108. In addition to a transceiver as in the embodiment shown in FIG. 1, the active devices 108 include a position/motion sensor 107 (e.g., a motion sensor, an accelerometer or GPS (global positioning system)). Further, the active device 108 is adapted to transmit detected position/motion sensor information to the computational using 114 using its transceiver.

In the various operating embodiments shown in FIGS. 1 and 8, a computation unit 114, with a processor and memory for storing instructions for tracking and augmenting objects recorded in a sequence of images, is coupled through a physical or wireless medium to the camera 102 and/or the network access point 112. In various of the operating embodiments, the computational unit 114 is adapted communicate with the active devices 108 over a wireless local area network through communication channel(s) 115 and 116 established using the network access point 112. In one embodiment, the network access point 112 forms part of a wireless local area network (WLAN) that is based on the IEEE 802.11 standard. In addition, the computation unit 114 receives over path 118 a sequence of images recorded by the camera 102. The camera 102 may be any form of digital and/or analog camera that may be configured (possibly with other software and/or hardware) to produce the sequence of images. In alternate embodiments, the sequence of images received over path 118 may be streamed from a storage medium that records image sequences earlier recorded by the camera 102.

In accordance with the various operating embodiments shown in FIGS. 1 and 8 and described in detail below, the wireless network may be adapted to discover active devices 108 operating within a defined geographic area, using for example the Bluetooth protocol. Such device discovery allows the active devices to be dynamically issued identifiers when discovered. This advantageously reduces the number of codes that identify active devices that is required to be managed by the computational unit 114. Further, the wireless network may be used to enforce centralized control so that active devices communicate or transmit information only upon request (e.g., at a specific point in time or on recurrent time interval). Further such centralized control may be used to synchronize communication events based on some criteria (e.g., based upon the receipt of a synchronization signal or based upon a value that matches an identifier). Such synchronization may advantageously be used to reduce transmissions required by active devices, thereby conserving battery power of portable active devices.

B. Augmenting Identification with Video Message Data

In various embodiments of the system 100 shown in FIG. 1, the active devices 108 emit signals 110 that encode identifying information (e.g., user name or device identifier) associated with object 106 (such as a person or a person's face). In one embodiment, the computational unit 114 of the system 100 operates as outlined in the flow diagram set forth in FIG. 2.

Figure 2:
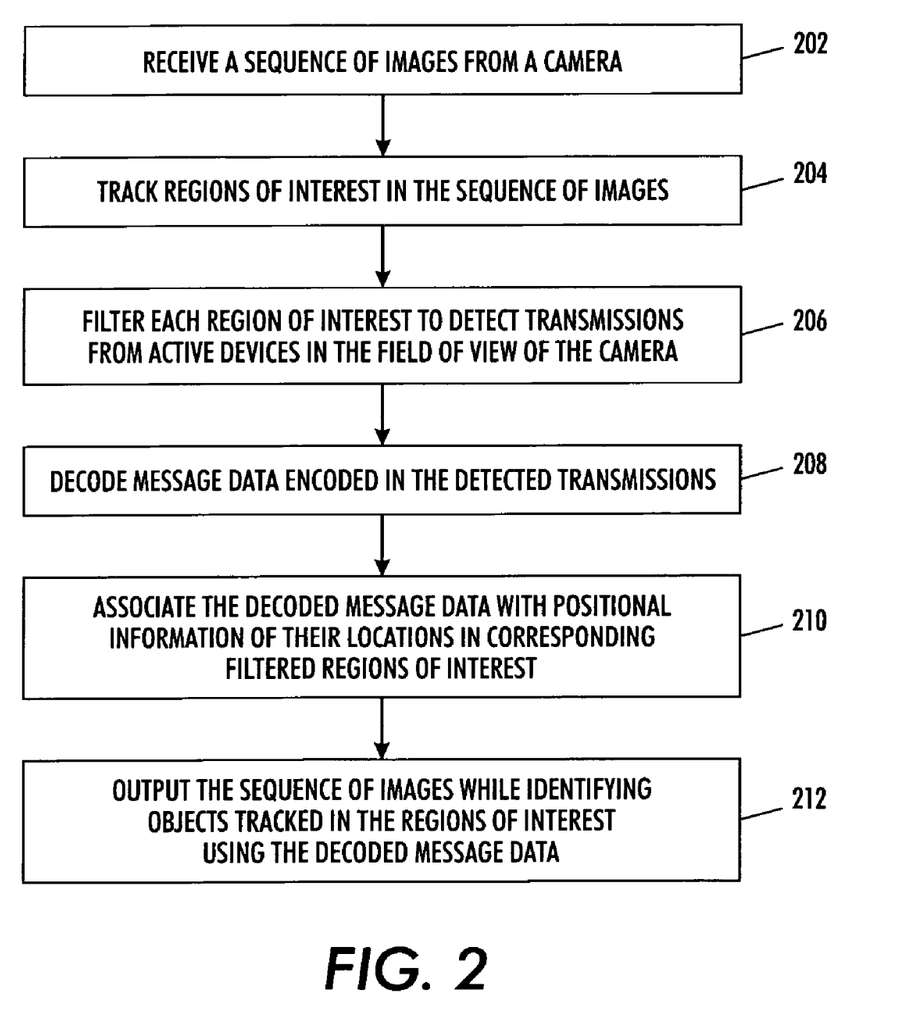
FIG. 2 is a flow diagram that sets forth operations performed by a computation unit of the system shown in FIG. 1 to augment the identification of objects tracked in a sequence of images with message data from active devices.

Initially at 202 in FIG. 2, a sequence of images is received from the camera 102 over path 118. The sequence of images has recorded therein encoded signals 110 emitted from active devices 108 in the field of view of the camera 102. Those skilled in the art will appreciate that the frequency of the sampling rate of the camera 102 must be at least twice the frequency that the encoded signals 110 are transmitted (i.e., the Nyquist rate) to fully reconstruct the encoded signals 110. At 204 in FIG. 2, regions of interest are tracked in the sequence of images. As shown at 199 in FIG. 1, each identified region of interest 120 has a defined shape and position in an image from the sequence of images. The regions of interest may be detected in an automated manner or manually through user selection.

At 206 in FIG. 2, each region of interest 120 is filtered to detect the presence of signals 110 emitted from the active devices 108 that are present in the field of view of the camera 102. Message data that is detected in each region of interest at 206 is decoded at 208. The decoded message data identifies information to augment knowledge of objects in the regions of interest tracked in the sequence of images, such as, the name of an active device or its user. As shown at 121 in FIG. 1, regions of interest 120 have associated therewith detected transmissions 122 from active devices 106 and their decoded message data 124.

At 210 in FIG. 2, the decoded messaged data 124 is associated with positional information of their locations in corresponding filtered regions of interest. That is, the positions of detected transmissions from active devices in the regions of interest are decoded and associated with identifying information 124. Finally at 212 in FIG. 2, the sequence of images is output identifying objects tracked in the regions of interest using the decoded message data, for example, as shown at 126 in FIG. 1.

B.1 Message Coding

Different embodiments used by active devices for standalone message encoding and/or directed (e.g., centrally controlled) message encoding are described in this section. Each of these embodiments may be used singly or in combination to encode message data in regions of interest detected in a recorded sequence of images by camera 102. Standalone message encoding involves methods for transmitting messages from the active devices 108 without input from the computational unit 114 (i.e., on standalone basis). Directed message encoding involves methods for transmitting messages from active devices 108 using, for example, a central controlling element such as computational unit 114.

B.1(a) Using Time as an Identifier

In a first set of embodiments, message data transmitted from active devices 108 is encoded using time as an identifier. That is, active devices 108 are recognized by the time at which messages are transmitted. More specifically, message data may be "time coded" by allocating different time periods for each active device 108 to transmit a signal. In these embodiments, signals detected and decoded in regions of interest by the computational unit 114 are associated with corresponding active devices depending on the time the signals were transmitted. Active devices may, for example, be pre-assigned timeslots during which data should be transmitted.

Figure 3:
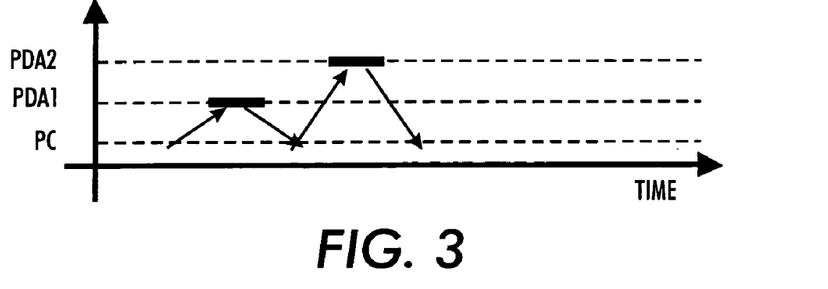
FIGS. 3, 4, and 5 illustrate different method in which active devices transmit signals that are then recorded and decoded by a camera.

FIG. 3 illustrates one method in which active devices 108 emit signals at different time intervals. The frequency that signals are emitted by the active device may be the same or different so long as they may be detected during the pre-assigned time interval. In this method, a PC (e.g., computational unit 114 or camera 102 through network access point 112) detects PDAs (i.e., active devices 108) in the vicinity of camera 102 for instance using the Bluetooth discovery mechanism. The PC 114 then requests each PDA 108 to emit an IR signal one by one during different time intervals at the camera 102. The PC 114 correlates the time of the transmission with the PDA 108 when detecting and decoding the signal at 122 and 124.

More specifically, the protocol shown in FIG. 3 operates as follows. First, the PC asks PDA1 for identification through IR transmissions. Then PDA1 emits during a predefined time period. This procedure is repeated for additional PDAs such as PDA2. While the PDAs are emitting, the PC processes the sequence of images recorded by the camera to detect the IR transmissions from the PDAs that are recorded therein. After the position of a signal is detected in the sequence of images, it is matched to the time period to identify the PDA, using a list of PDAs queried and the time interval queried (which may for example be stored in the PC's memory). The protocol shown in FIG. 3 may be repeated, for example, until all regions of interest have been identified and thereafter updated following a predefined time interval.

Figure 4:
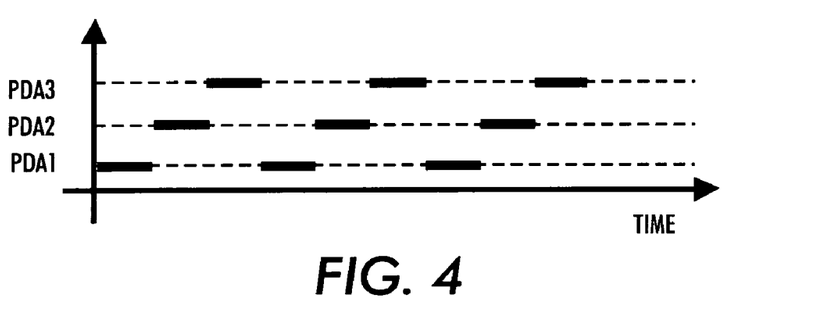

FIG. 4 illustrates another method in which active devices 108 emit at different time intervals. In this method, like in the method shown in FIG. 3, all PDAs may emit at the same or different frequencies. In this method, unlike the method shown in FIG. 3, the time intervals at which each PDA emits are synchronized. For example, the time intervals may be allocated to the different PDAs either by a lead unit or alternatively through a negotiation performed between the PDAs. The lead unit may, for example, be a PDA or the computational unit 114.

An alternate method combines the embodiments shown in FIGS. 3 and 4. According to this alternate method, the method shown in FIG. 3 is used to periodically synchronize PDAs and assign broadcast time intervals as PDAs announce that they may be entering or leaving the field of view of the camera defined for example by a preset geographic area. The second method is then used by the PDAs to emit identifying information during their assigned and/or negotiated broadcast time interval.

In yet another method, active devices 108 may emit transmissions detectable by the camera 102 on demand or according to a time-sharing policy by enumeration. Enumeration is similar to a dichotomy search where each PDA is assigned a binary identifier. Over different time intervals each PDA responds only if its binary code for the period is true. After a sequence of time intervals in which all the bits of the PDAs binary identifiers are iterated, all PDAs may be identified.

For example, one protocol may operate as follows for a group of PDAs: (a) the PC requests all PDAs, to transmit if the first digit of their binary code is equal to one; (b) all PDAs whose first digit of their identifying code is equal to one transmit during a certain time; (c) PC detects if signals transmitted from PDAs; (d) if signals detected, PC requests all PDAs with first and second digits of their binary code equal one to transmit; (e) if no signals detected, PC ask all PDAs whose first digit is zero and second digit equal one to transmit; (f) PDAs with the first and second digits appropriate emit during a certain time.

B.1(b) Using Frequency as an Identifier

In a second set of embodiments, message data is encoded by the active devices 108 using a frequency encoding. Message data is "frequency coded" by allocating different frequencies for each active device 108 to transmit a signal. In this embodiment, signals detected and decoded in regions of interest by the computational unit 114 are associated with corresponding active devices depending on the frequency that the signals were transmitted.

Figure 5:
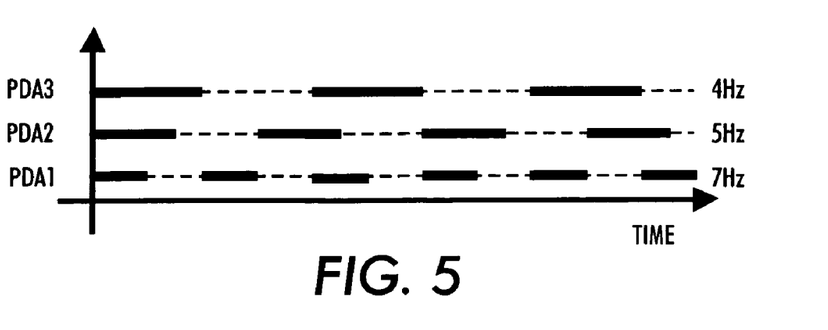

FIG. 5 illustrates one embodiment in which each PDA 108 emits at different frequencies that are then recorded by camera 102. Table 1 illustrates an example set of code words and their corresponding frequencies. Thus, to transmit at different frequencies using Table 1, each PDA 108 emits at a different transmission rate (which is distinguished from the frequency of the light emitted from the PDA). Using this method, PDAs may emit at will (i.e., at the same time or at different times), and are discriminated from each other based on their transmission rate (e.g., blinking rate). The PDA transmission rates (e.g., as shown in Table 1) may be issued by a central authority, such as PC 114, or negotiated by the PDAs 108, when an active device is discovered upon approaching or entering the field of view of the camera. The frequency of each signal emitted by the PDAs may be reconstructed using a set of samples that satisfy the Nyquist sampling rate. (For example, to reconstruct the original signals from 10 PDAs that emit between 2 Hz and 12 Hz, the minimum observation time should be approximately equal to one second for a camera recording 24 images a second.)

TABLE 1

| FREQUENCY | CODE WORD |
|---|---|
| 12 Hz | 101010101010101010101010101 |
| 11 Hz | 110011001100110011001001 |
| 10 Hz | 111000111000111000111000111000 |
| 9 Hz | 111100001111000011110000 |
| 8 Hz | 111111000001111100000111111 |
| 7 Hz | 111111100000001111111000000011 |

B.1(c) Using Digital Codes as an Identifier

In a third embodiment, message data is encoded by PDAs 108 and detected by PC 114 using digital codes. That is, detected emissions from each PDA 108 are treated as a series of binary information (i.e., the presence or absence of light). In this embodiment, each PDA emits a unique pattern which is a binary code word with possibly error correction and detection to manage noisy channels. To detect the start of transmission of a binary code word, each binary code word may be cyclic. That is, all of the shifts of a binary code word that are decoded by the computational unit 114 are decode as a single identity, as shown for example in Table 2 for four bit code words and their equivalence class (i.e., shifted equivalents). Alternatively, code words may be transmitted between a header and a trailer for detection of its start and end by the computational unit 114, where each pattern between the header and trailer uniquely identifies each active device 108 or its user.

TABLE 2

| CLASS | CODE WORDS |
| --- | --- |
| A | (1000), (0100), (0010), (0001) |
| B | (1010), (0101) |
| C | (1100), (0110), (0011), (1001) |

Advantageously using binary cyclic code words, the computational unit 114 is not required to synchronize with the first bit of a code word. In addition, after the length of any binary cyclic code word, a determination may be made regarding the identity of the transmitting active device. In one embodiment, BCH (Bose-Chaudhuri-Hocqunghem) codes of 15 bits, permit 127 code words, with up to 4 errors detected and 2 errors corrected per word (i.e., where BCH(15, 7, 5), defines a code length of 15 bits, with 7 bits information, 8 bits of control, and a minimum distance of 5 between code words). At a transmission rate of 25 frames per-second (e.g., an example capture rate of camera 102), such code words may be transmitted in 15/25 seconds.

More specifically, the code words may be transmitted continuously from each active device 108, and since each code word is cyclic code words may be detected and decoded after receipt of a number of bits corresponding to their length. For example, BCH(15, 7, 5) code words of 15 bits have 12 equivalence classes as shown in Table 3 that may be associated with the active devices 108, where each equivalence class can be derived by performing a shift operation to one of its code words. In this embodiment, code words with all zeros and all ones are discarded, thereby identifying up to ten PDAs. The code word with all zeros (i.e., class 1 in Table 3) is omitted because non-emitting active devices are not expected to emit. The code word with all ones (i.e., class 12 in Table 3) is omitted because decoding such a signal may be the result of reflections from sunlight or other bright lights.

TABLE 3

| CLASS | CODE WORD |
| --- | --- |
| 1 (omit) | (000000000000000) |
| 2 | (100100100100100) |
| 3 | (100010111000000) |
| 4 | (110011100100000) |
| 5 | (101001011000010) |
| 6 | (101000011101100) |
| 7 | (111100010011010) |
| 8 | (111101010110100) |
| 9 | (111100110001101) |
| 10 | (101000111111011) |
| 11 | (110110110110110) |
| 12 (omit) | (111111111111111) |

With reference again to FIG. 1, the PDAs 108 in this embodiment initially encode information such as a system identifier or a user identifier using one of the ten available classes set forth in Table 3, where each code word is 15 bits long, for which 7 bits record information and 8 bits record control. Code words emitted by the PDAs 108 (e.g., using IR) are recorded by camera 102 and received by computational unit 114. After tracking regions of interest, code words are detected at 122 (and corrected if errors are detected), and subsequently decoded to identify each PDA in the sequence of recorded images.

Generally, a code distance of $d=s+1$ is necessary to detect s errors, and a code distance $d=2*r+1$ is necessary to correct r bits. A code word is the product of an information word and a generator matrix. Error detection is performed by dividing (using Euclidean division) the detected code word by the generator polynomial. A zero result of the division signifies the detected word is the code word and the quotient is the corresponding information word. A non-zero result of the division signifies errors. Alternatively, it is possible to detect errors by multiplying the detected word by a control matrix, where a zero result signifies no errors and a non-zero result signifies errors. If the computation reveals the existence of errors, their correction depends on the cyclic code used (e.g., CDC, BCH). (For more information on BCH coding see the following publications which are incorporated herein by reference: R. C. Bose and D. K. Ray-Chaudhuri, "On a Class of Error Correcting Binary Group Codes," Inf. Control, vol. 3, pp. 68-79, March, 1960; and W. W. Peterson, "Encoding and Error-Correction Procedures for the Bose-Chaudhuri Codes," IRE Trans. Inf. Theory, vol. IT-6, pp. 459-470, September 1960.)

In either of the methods described in this section, the code words (e.g., as set forth in Tables 2 or 3) may be issued by a central authority, such as PC 114, or negotiated by the PDAs 108, when an active device is discovered upon approaching or entering the field of view of the camera.

B.2 Message Detection

Detecting signals encoded in the sequence of images is performed by a series of one or more filtering operation on detected regions of interest. It will be appreciated by those skilled in the art that signals recorded from PDAs may be vary depending on their color, shape, size, and intensity. In addition during signal observation time (i.e., the time that PDAs are being observed), PDAs may not be well oriented to the camera, or PDAs may be hidden behind other objects. If the detection time (i.e., the time needed to recognize an encoded signal) is reduced the chance of receiving such signal interference is lessened.

Figure 6:
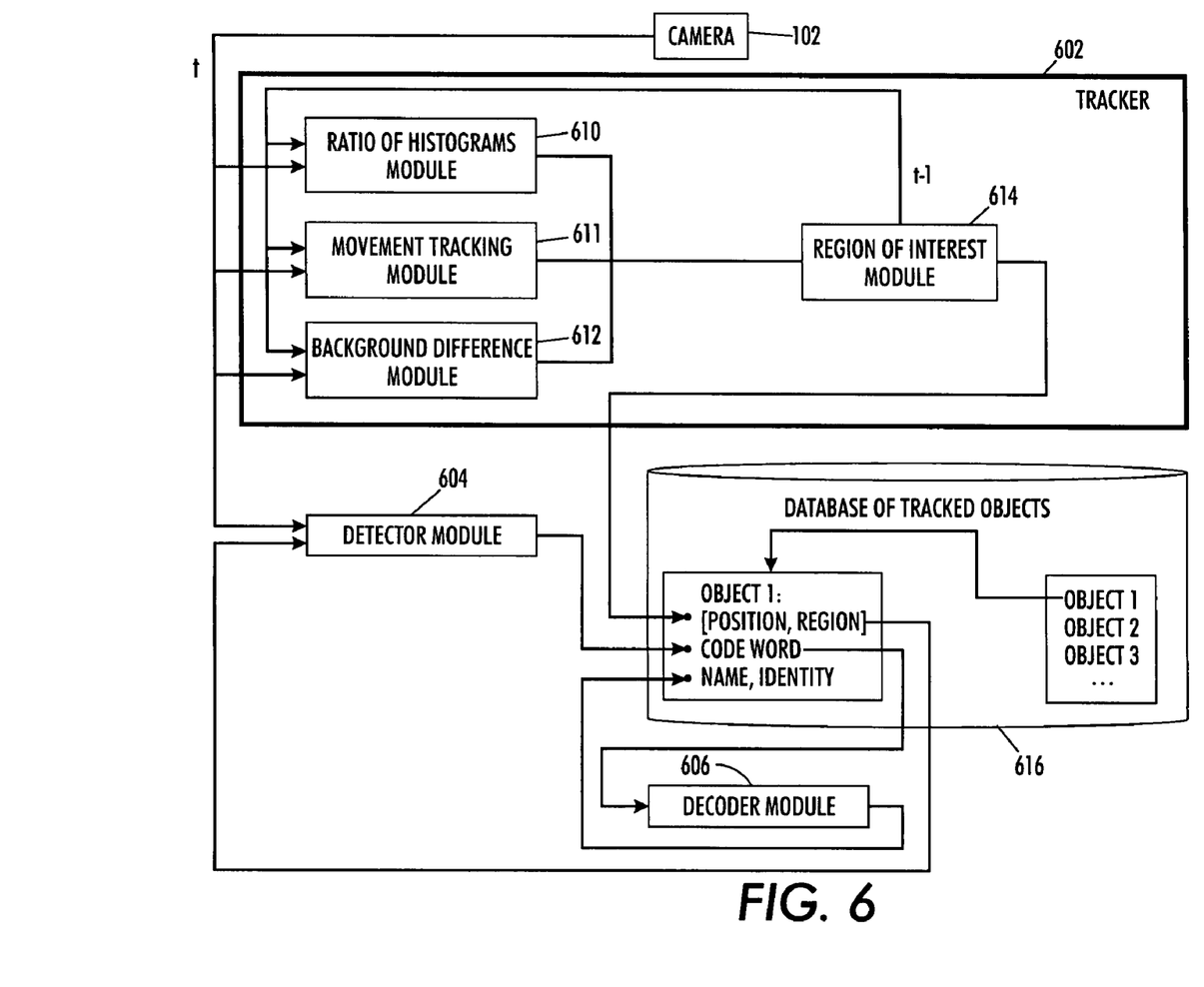
FIG. 6 illustrates an architecture for detecting and tracking regions of interest.

FIG. 6 illustrates an architecture for detecting and tracking regions of interest. In accordance with one instance of this architecture, PDAs 108 transmit identifying information in the form of a sequence of on/off transmissions (i.e., blinking) from the PDAs' IR ports. The sequence of on/off transmissions are recorded by the camera 102 and processed by the computational unit 114. As outlined above, tracking objects such as people in a recorded sequence of images involves first identifying regions of interest (e.g., the regions where PDAs or objects carrying PDAs are likely to be found). Once regions of interest are identified in the sequence of images, a series of filters are applied to the regions of interest to detect the PDAs' transmissions. Generally, the architecture shown in FIG. 6 has four primary components: a tracker 602 (for identifying regions of interest), a signal detector module 604 (for detecting PDA signals), a decoder module 606 (for identifying the tracked object from a code word), and a database of tracked objects 116 (for recording tracked objects in the sequence of images).

B.2(a) Region Tracking

As shown in FIG. 6, each image in a sequence of images recorded by the camera 102 (i.e., at time "t") is input to the tracker 602 and the detector 604. In addition, prior image information (i.e., at time "t-1") is input to the tracker 602. The tracker may for example be developed using ImaLab software development environment generated as part of the PRIMA (Perception and Integration for Smart Spaces) project of GRAVIR Labs hosted by INRIA Rhône-Alpes. Alternatively, the tracker may be developed using principles of the tracking system disclosed by Caporossi et al., in "Robust Visual Tracking from Dynamic Control of Processing", the International Workshop on Performance Evaluation of Tracking and Surveillance, Prague, Czech Republic, pp. 23-31, May 2004, which is incorporated herein by reference.

In one embodiment, the tracker 602 is a recursive estimator that tracks objects in real time using a plurality of criteria to, for example, detect and track a person. A region detection module 610 in the tracker 602 combines output from: a ratio of histograms module 610 that uses a ratio of histograms to track a determinate color (such as skin) through a sequence of images; a movement tracking module 611 that computes image differences; and a background difference module 612 that considers background difference of images when identifying moving objects between frames.

In one instance of the embodiment, the flow of the region of interest module 614 operates using a recursive estimator, such as, a Kalman filter (see Kalman, entitled "A New Approach to Linear Filtering and Prediction Problems", in Transactions of the ASME, Journal of Basic Engineering, Vol. 82, No. Series D, pp. 34-45, 1960, which is incorporated herein by reference). Such a recursive estimator may comprise the following five phases: (a) prediction; (b) observation; (c) prediction of observation; (d) validation of observation; and (e) update of estimation.

B.2(b) Signal Detection

Referring again to FIG. 6, identified positions and their associated regions of interest output from region of interest module 614 are stored in a memory recording the database of tracked objects 616. The detector module 604 receives as input images from the sequence of images recorded by camera 102 and any identified positions and regions stored in the database 616 concerning the images. From the input 601 and 616, the detector module 604 identifies code words transmitted in each region of interest.

In one embodiment, each region of interest is filtered by the detector 604 to identify the presence of an IR spot indicating a transmission from an active device. Set forth below are three methods for detecting the presence of an IR spot in an image, which is assumed to be generally circular in shape (although other shapes are possible). Generally, the methods of IR spot detection may rely on any combination of the following assigned parameters that specify an area of an image has correct: luminosity (e.g., by filtering images to identify IR transmissions), size (e.g., by considering regions between 1 and 144 pixels), shape (e.g., by considering circular shapes), and distance (e.g., by using the distance between consecutive frames to consider regions identified in two frames to be the same).

Further, depending on the environment in which the camera 102 is recording the sequence of images, one or more of the four parameters may be more or less strictly defined by the three methods of IR spot detection. In addition, depending on the environment in which the camera 102 is recording, the camera may be adapted to zoom in on identified regions of interest to capture images of greater resolution to improve the three methods of IR spot detection.

In a first method, the detector module 604 uses a color filter to identify the presence of an IR spot, where the color filter filters IR signals captured by the camera 102 in the recorded sequence of images 601. It will be appreciated by those skilled in the art that the exact filter will depend on the recording properties of the sensor used to detect IR transmission that are recorded by the camera 102. Thus, a filter is defined that perceives IR transmissions as some combination of red, green, and blue light that satisfies a predefined range of values.

In a second method, a filter (such as a Sobel filter) is used to find edges and a transform (such as the Hough transform) is used to find circles with pre-defined radiuses, and subsequently a color filter is used to evaluate the colors inside the detected circles. As the size of the IR spot is not known a priori, several radius sizes are used to evaluate the transform and subsequently the best candidate is selected. To account for possible computational complexity of this embodiment, the transmission rate of PDAs may be slowed down by emitting one-bit-per m-frames instead of one-bit-per frame.

Figure 7:
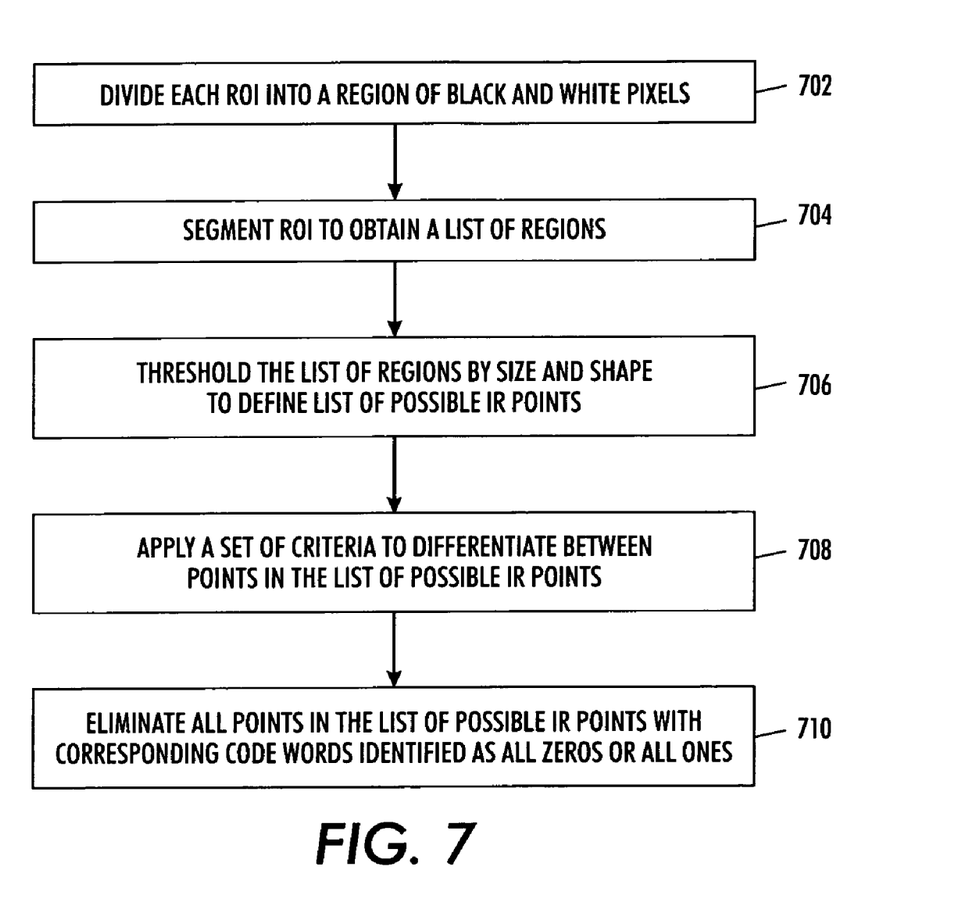
FIG. 7 is a flow diagram that outlines one method for identifying the presence of an IR (infrared) spot transmitted from an active device in an image recorded with a camera.

In a third method, all possible IR spots are computed in each region of interest and recorded in a list. This method assumes that regions of interest which do not have active devices that are transmitting information (such as a sun reflection) will rarely produce a sequence of spots over time that may be decoded. FIG. 7 is a flow diagram that outlines the third method to identify the presence of an IR spot in an image transmitted from an active device.

Initially at 702, a "color filtering" operation divides each region of interest (ROI) of an image into a set of black and white pixels. Specifically, if the luminosity of a pixel in a ROI is lower than a pre-determined threshold then it is assigned to be black; otherwise, it is assigned to be white. That is at 702, IR transmissions are mapped from RGB (red, green, and blue) measured signals to a single color (e.g., white, although other colors may be used). At 704, the image is segmented to obtain a list of all regions. At 706, the list of all regions is thresholded by size and shape (or form) to define a list of possible IR points. At 708, various criteria are applied to the possible IR points in the list to differentiate between points in the list. Finally at 710, points in the list of IR points are eliminated if their corresponding code word is a sequence of all ones or zeros.

In one embodiment at 706, regions are identified as possible IR points if they have a concrete size (e.g., between 2 and 144 pixels) and have a certain form (e.g., round). For example in one embodiment, first and second moments of the regions are computed. The second moments of a region define a covariance matrix that in turn may be used to define a ratio of eigenvalues. If the ratio of eigenvalues for a region is approximately equal to one then the region is assumed to approximate the shape of a circle.

In one embodiment at 708, points in the list of possible IR points are differentiated according to the following three criteria: (a) as belonging to a new region that appears in the image sequence; (b) as belonging to an existing (i.e., previously detected) region that appears in the sequence of images; and (c) as belonging to a region previously identified but in which no IR spot was previously detected. Assigning the criteria is based on the determination that regions in consecutive frames are the same. This determination may be made using, for example, a Kalman filter or by computing the pixel distance between two regions (e.g., if the pixel distance is less than a predefined threshold value, such as 20, then the regions are assumed to be the same).

B.2(c) Signal Decoding

Referring again to FIG. 6, once the detector module 604 records in database 616 identified code words in objects tracked in the sequence of images, the decoder module 606 decodes the code word using a code word to a name/identity reference stored in the database 616 (e.g., in the form of a lookup table). The name/identity of the decoded code word is then recorded along with the tracked object thereby identifying (or providing information to augment the identification of) the tracked object. For example, after decoding in a region of interest in a sequence of images the name/identity of a code word emitted from a PDA 108 recorded together with a tracked object 106, as shown in FIG. 1, the name/identity may be used to label the tracked object (as shown for the objects labeled "Jan" and "Mat" at 126).

C. Augmenting Identification with Transmitted Motion Data

In various embodiments of the system 800 shown in FIG. 8, the active devices 108 transmit detected motion over communication channels 116 that specify motion information (e.g., changing coordinate information) associated with object 106 (such as a person). In one embodiment, the computational unit 114 of the system 800 operates as outlined in the flow diagram set forth in FIG. 9.

Figure 9:
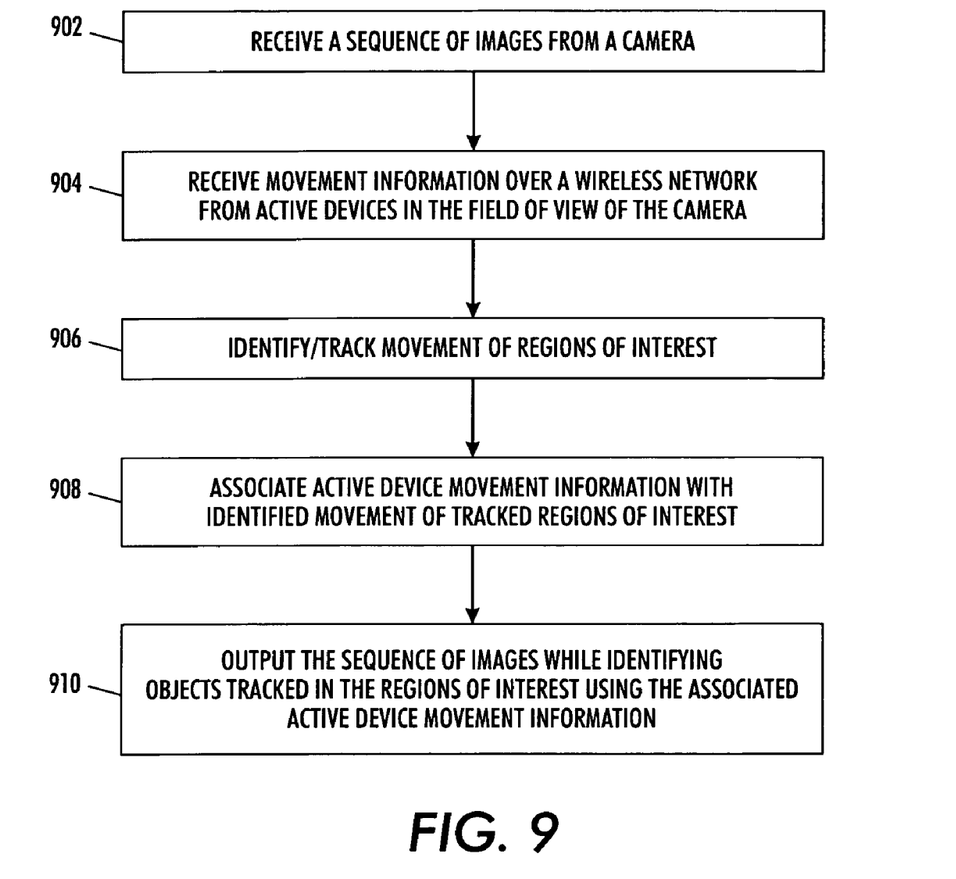
FIG. 9 is a flow diagram that sets forth the operations of a computational unit in the system shown in FIG. 8 to augment the identification of objects in an image with motion data from active devices.

At 902, the computational unit 114 receives a sequence of images over communication path 118 from camera 102. The sequence of images received by the computational unit 114 record the objects 106 in the field of view of the camera 102. In addition at 904, the computational unit 114 receives over communication path 115 and 116 from active devices 108, detected position/motion sensor information (e.g., changes in position/motion information or absolution position/motion information) together with identifying information from the corresponding active device.

At 906, the computational unit 114 identifies regions of interest in the sequence of images. The regions of interest may be identified automatically using known shape detection/classification techniques or manually by user selection, as described above. Once regions of interest are identified, they may be tracked in successive images making up the sequence of images (e.g., by computing image differences).

At 908, the computational unit 114 uses the motion information (i.e., movement reporting information) transmitted by the active devices 108 to augment the identification of tracked objects. In one embodiment, each active device 108 registers its identity with the computational unit 114, thereby allowing the computational unit to associate transmitted motion of an object with an identity. At 910, the sequence of images are output while identifying the tracked regions of interest using position/motion information associated with the active devices.

For example, as shown in FIG. 8, regions of interest which include the active devices 108 are initially identified in images at 802 in the sequence of images (at 906). Subsequently, movement of a region of interest is detected between image frames at 806. Finally, to label regions of interest identified in the sequence of images at 808 (e.g., Jan and Mat), active device movement reporting information (which includes active device identifying information) at 804 is associated with the detected regions of interest tracked between image frames at 806.

D. Example Embodiments

In one operating embodiment of the systems described herein, people are identified on a recorded sequence of images. Each person recorded carries or wears an active device (such as a PDA) that transmits IR signals. The IR signals encode message data, using any single or combination of the encoding methods described herein. The IR encoded signals are recorded in a sequence of images by the camera 102. The computational unit 114 detects and decodes the encoded signals in regions of interest in the sequence of images. Once decoded, the message data is used to identify objects in corresponding regions of interest.

The message data may, for example, identify names, places, objects, devices, users, etc. (i.e., identifying information) that appear in sequences of images over time. In one embodiment, the identifying information is placed near objects in the region of interest. Alternate embodiments, such as audio or labeling on demand may be used. On demand labeling may involve highlighting labels based on some user input, such as a sound or the hovering of a pointer device over a region of interest in the sequence of image.

Further, a combination of methods may be used together, for example, by combining decoded transmissions from active devices in a sequence of images together with position/motion information transmitted from active devices to augment the identification of regions of interest tracked in a sequence of images. Advantageously, such a combination would minimize signal interference (e.g., identifying that a moving active device has hid a stationary active device).

E. Miscellaneous

Those skilled in the art will recognize that a general purpose computer may be used for implementing certain elements of the systems described herein, including the camera 102, network access point 112, and computational unit 114. Such a general purpose computer would include hardware and software. The hardware would comprise, for example, a processor (i.e., CPU), memory (ROM, RAM, etc.), persistent storage (e.g., CD-ROM, hard drive, floppy drive, tape drive, etc.), user I/O, and network I/O. The user I/O can include a camera, a microphone, speakers, a keyboard, a pointing device (e.g., pointing stick, mouse, etc.), and the display. The network I/O may for example be coupled to a network such as the Internet. The software of the general purpose computer would include an operating system.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for identifying objects in a sequence of images, comprising:
   receiving the sequence of images recorded using a camera having a field of view;
   detecting regions of interest in the sequence of images including at least some the objects;
   locating in the detected regions of interest encoded transmissions from active devices positioned in the field of view of the camera;
   outputting the sequence of images while identifying at least some of the regions of interest using encoded transmission identified therein, wherein the encoded transmissions are transmitted from one or more mobile computing devices.

2. The method according to claim 1, wherein the object is a face.

3. The method according to claim 1, further comprising recording the sequence of images with a video camera.

4. The method according to claim 1, wherein said outputting labels at least one region of interest in the sequence of images with an identity corresponding to the encoded transmission.

5. The method according to claim 1, further comprising directing when the active devices transmit the encoded transmissions that are recorded in the sequence of images.

6. The method according to claim 5, further comprising:
   filtering regions of interest in the sequence of images based on one or more filtering criteria to detect encoded transmissions from active devices; and
   decoding the encoded transmissions to associate the regions of interest with an identity corresponding to the encoded transmissions.

7. The method according to claim 6, wherein said filtering maps a detected color arrangement to a black and white image.

8. The method according to claim 7, wherein the detected color arrangement records infrared frequencies.

9. The method according to claim 6, wherein said decoding decodes digital coded message data.

10. The method according to claim 6, wherein said decoding decodes one of time and frequency coded message data.

11. The method according to claim 6, wherein said decoding decodes message data after sequentially polling by one of an active device or a message bit.

12. The method according to claim 1, wherein the encoded transmission are detected according to assigned parameters that specify one or more of correct luminosity, size, shape, and distance.

13. The method according to claim 1, further comprising:
    receiving motion information from active devices in the field of view of the camera;
    associating the movement information from the active devices with the movement of the detected regions of interest between images in the sequence of images;
    outputting the sequence of images while identifying at least some of the regions of interest using the motion information.

14. A method for identifying objects in a sequence of images, comprising:
    receiving the sequence of images recorded using a camera having a field of view;
    receiving motion information from active devices in the field of view of the camera;
    detecting regions of interest in the sequence of images including at least some the objects;
    associating the movement information from the active devices with the movement of the detected regions of interest between images in the sequence of images;
    outputting the sequence of images while identifying at least some of the regions of interest using the motion information;
    locating in the detected regions of interest encoded transmissions from active devices positioned in the field of view of the camera; and
    outputting the sequence of images while identifying at least some of the regions of interest using encoded transmission identified therein,
    wherein the encoded transmissions are transmitted from one or more mobile computing devices.

15. A method for identifying objects in a sequence of images, comprising:
    receiving the sequence of images recorded using a camera having a field of view;
    receiving motion information from active devices in the field of view of the camera;
    detecting regions of interest in the sequence of images including at least some the objects;
    locating in the detected regions of interest encoded transmissions from active devices positioned in the field of view of the camera;
    associating the movement information from the active devices with the movement of the detected regions of interest between images in the sequence of images;
    outputting the sequence of images while identifying at least some of the regions of interest using encoded transmission identified therein and at least some other of the regions of interest using the motion information, wherein the encoded transmissions are transmitted from one or more mobile computing devices.

16. The method according to claim 15, wherein the encoded transmissions are transmitted by the mobile computing devices as infrared transmissions.

* * * * *